US009413618B2

(12) United States Patent
Martinez Perea et al.

(10) Patent No.: US 9,413,618 B2
(45) Date of Patent: Aug. 9, 2016

(54) METHOD, SYSTEM AND DEVICES FOR MANAGING USER PROVISIONING OF A SERVICE IN AN IMS NETWORK

(71) Applicant: Vodafone IP Licensing Limited, Newbury, Berkshire (GB)

(72) Inventors: Rogelio Martinez Perea, Madrid (ES); Enrique Collado, Madrid (ES); Rafael Dominguez, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 190 days.

(21) Appl. No.: 14/083,147

(22) Filed: Nov. 18, 2013

(65) Prior Publication Data

US 2014/0143412 A1  May 22, 2014

(30) Foreign Application Priority Data

Nov. 16, 2012  (EP) .................................. 12382452

(51) Int. Cl.
*H04L 12/24*    (2006.01)
*H04L 29/06*    (2006.01)

(52) U.S. Cl.
CPC ............ *H04L 41/50* (2013.01); *H04L 65/1016* (2013.01); *H04L 65/1073* (2013.01)

(58) Field of Classification Search
CPC ............ H04L 65/1016; H04L 65/1069; H04L 65/1006; H04L 65/1073; H04L 64/40; H04L 65/1063; H04L 67/306
See application file for complete search history.

(56) References Cited

U.S. PATENT DOCUMENTS

| 7,277,702 | B2 * | 10/2007 | Ropolyi .................. H04L 63/00 370/352 |
|---|---|---|---|
| 2010/0093284 | A1 * | 4/2010 | Terrero Diaz-Chiron ......... H04W 24/10 455/67.11 |
| 2011/0028130 | A1 * | 2/2011 | Swaminathan ... H04M 3/42195 455/414.1 |
| 2015/0120947 | A1 * | 4/2015 | Guo .................... H04L 65/1016 709/228 |

OTHER PUBLICATIONS

Henry,K, et al., "Rich Communication Suite", 13th International Conference on Intelligence in Next Generation Networks, Oct. 26-29, 2009, pp. 1-6.*

* cited by examiner

*Primary Examiner* — Kevin Bates
*Assistant Examiner* — Lesa Kennedy
(74) *Attorney, Agent, or Firm* — Workman Nydegger

(57) ABSTRACT

Present invention refers to a method, system and devices for managing user provisioning of a service in an IP Multimedia Subsystem (IMS) network. The proposed solution optimizes the dimensioning of Home subscriber server (HSS) according to active users.

11 Claims, 1 Drawing Sheet

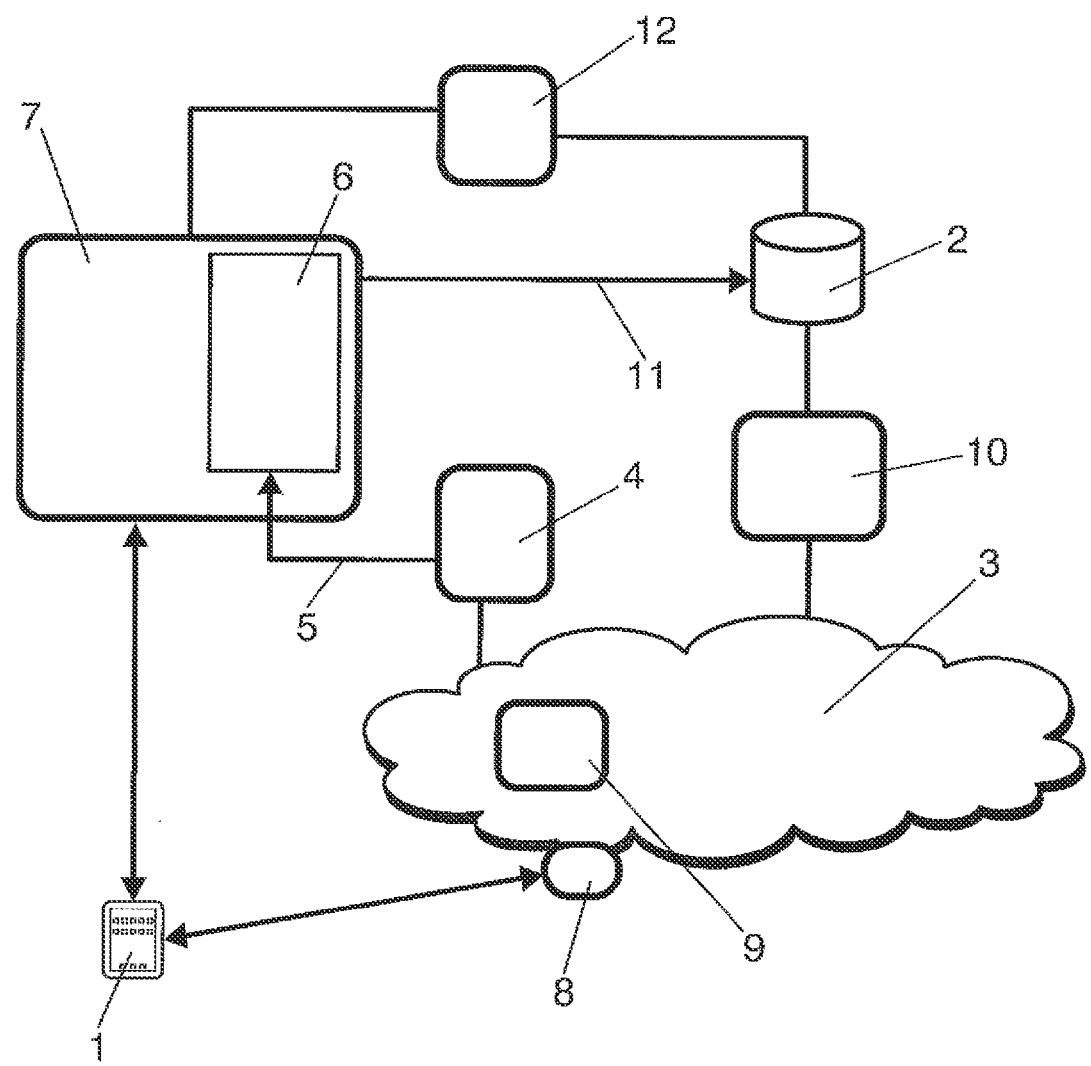

METHOD, SYSTEM AND DEVICES FOR MANAGING USER PROVISIONING OF A SERVICE IN AN IMS NETWORK

CROSS REFERENCE TO RELATED APPLICATIONS

This application claims priority to European Application Number 12382452.6, filed on Nov. 16, 2012, the entirety of which is incorporated herein by reference.

TECHNICAL FIELD OF THE INVENTION

The present invention relates generally to IMS networks and more specifically to the provisioning of user of services, as Rich Communication Suite (RCS) services, in order to optimize the dimensioning of HSS according to active users.

BACKGROUND OF THE INVENTION

Nowadays IP Multimedia Subsystem (IMS) networks are firmly penetrating in the market due to the increasing demand of mobile and fixed multimedia services. IMS networks are implemented on a 3GPP standardized implementation of Session Initiation Protocol (SIP), and runs over standard Internet Protocol (IP) networks, but existing phone systems (both packet-switched and circuit-switched) are supported. IMS networks truly merge the Internet with the world of mobile telephony, it uses mobile technologies to provide ubiquitous access and Internet technologies to provide appealing services.

As important nodes of IMS network for the scope of this invention, it can be pointed the Home Subscriber Server (HSS) and the CSCF.

The HSS is a master user database that supports the IMS network entities that actually handle calls. It contains the subscription-related information (subscriber profiles), performs authentication and authorization of the user, and can provide information about the subscriber's location and IP information. It is similar to the GSM Home Location Register (HLR) and Authentication Centre (AuC).

The CSCF is the central node of the signalling plane. It is a SIP server, but performs session control too. It is located in the home network and uses Diameter interfaces to the HSS to download user profiles and upload user-to-CSCF associations. All necessary subscriber profile information is loaded from the HSS. It handles SIP registrations, which allows it to bind the user location and the SIP address. It decides to which application server(s) the SIP message will be forwarded, in order to provide their services and it provides routing services.

Diameter interfaces are the reference points for interactions between the following HSS and CSCF. The standard interface is described in the 3GPP Specifications TS29.228 and TS29.229. The CSCF queries the HSS using the Diameter Cx interface to retrieve the user location and then routes the SIP request back to the CSCF.

Leading the services deployed over IMS network is Rich Communication Suite (RCS) which is a service upgrade that marks the transition of messaging and voice capabilities from Circuit Switched technology to an all-IP world. RCS provides a framework for discoverable and interoperable advanced communication services and detailed specifications for a basic set of advanced communication services. Detailed information about the specification can be found at GSMA webpage as a public document.

Main features of RCS are:
Enhanced Phonebook with service capabilities.
Enhanced Messaging, since RCS enables a large variety of messaging options including chat and messaging history and file transfer.
Enriched Call. Users may share contents during a voice call instead of the traditional "see what I see" capability.

For RCS 5, the one mandatory network element is the IMS core system which enables peer-to-peer communication between RCS clients. Other network nodes can be deployed by the Service Provider to provide additional parts of the RCS feature set. For example the ACS node (or AutoConfiguration Server), which is responsible for both the client configuration and the network provisioning. The client configuration is based on an http request followed by an https session in its simplest form. Said https session includes the configuration xml, with all the relevant information about the IMS connection for registering (such as IPs or urls, connection parameters and protocols, authorization user, password, etc).

Early stage RCS deployments are characterized by a very small "Active/Provisioned" (A/P) users ratio and, until sufficient penetration of RCS service is achieved, the A/P ratio is likely to be maintained at very low levels. It is estimated that significantly increasing the A/P ratio may still take several years.

On the other hand, in order to increase the RCS penetration, the HSS need to be dimensioned according to the expected number of provisioned users, but the small ratio of active/provisioned users means that the HSS are underused. Optimizing properly the dimensioning of the HSS is a main issue for telco companies and users which are provisioned but their profile is "non-active" means a problem. Every user provisioned in a HSS costs money to be paid by telco companies and the high number of non-active users provisioned in a HSS costs a lot of money that has to be paid to a third party (the owner of the HSS) when actually, the non-active users are not using the HSS at all.

SUMMARY OF THE INVENTION

Present invention serves to solve the aforesaid problem by providing a method for managing user provisioning of at least one service in a IMS network, said method comprising the steps of:
a) a first server acquiring service traffic information of a user for the at least one service from the IMS network;
b) said first server sending the service traffic information of the user to a managing node;
c) checking in the managing node if said service traffic information of the user meets a set of criteria predefined in the managing node;
d) if the service traffic information of the user does not meet the set of criteria, said user is marked as non-active for the at least one service by the managing node and it sends an indication to a configuration server, indicating that said user has been marked as non-active for the at least one service;
e) after receiving said indication the configuration server, sending a message to a Home subscriber server, HSS, telling the HSS to delete the data of said user, said message including a user identification of said user;
f) The HSS deleting the data of said user.

Said user will be a user whose subscription related information is in the HSS, that is, a provisioned user.

In an embodiment, said method further includes the following steps:
g) a detecting node monitoring the messages between the HSS and a CSCF, call session control function server;

h) when the CSCF receives a request for a communication between a first user and a second user, if the detecting node detects an error message from the HSS to the CSCF, telling that the data of the second user is not included in the HSS, the detecting node sends a message to the CSCF indicating that said communication request should be directed to the first server and the CSCF forwards said communication request to the first server;
i) the first server receiving the communication request directed by the detecting node and notifying to the managing node;
j) sending a message to the HSS including information to register said second users data in the HSS;
k) after receiving said message, the HSS registering said second users data.

Said message from the HSS to the CSCF, telling that the data of the second user is not included in the HSS, in an embodiment is a Diameter Error User Unknown Message.

In an embodiment, after step h), a step where the first server indicates to the first user, to try again the request for communication with the second user after a certain period of time and said indication by the first server to the first user may be a response to a SIP INVITE message sent by the CSCF to the first server, said response being a 503 Retry After.

The message to the HSS in step j) may be sent by the managing node or by the configuration server, and it can be sent directly to the HSS or first sent to a Network Abstraction Layer node and from the Network Abstraction Layer node to the HSS.

In the previous embodiments, the at least one service may be a RCS, Rich Communication Suite, service and where the configuration server is an RCS auto configuration server and the user is a RCS user.

The managing node may be part of the configuration server or it may be an independent network node which communicates with the configuration server.

In another aspect, a network node is provided which comprises means for receiving service traffic information of a user for at least one service in a IMS network; means for checking if said service traffic information of the user meets a set of criteria predefined and means for, if the service traffic information of the user does not meet the set of criteria, sending a request to a Home subscriber server, HSS, for deleting the data of said user.

In another aspect, a network node is provided which comprises: means for acquiring service traffic information of a user for at least one service in a IMS network; means for sending said service traffic information to another network node and means for, when receiving a communication request, from a CSCF server, notifying said another network node.

In another aspect, a network node is provided which comprises: means for monitoring messages between the HSS and a CSCF, call session control function server and means for, when the CSCF receives a request for a communication between a first user and a second user and the detecting node detects an error message from the HSS to the CSCF telling that the data of the second user is not included in the HSS, sending a message to the CSCF indicating that said communication request should be directed to a first server.

In another aspect, a system for managing provisioning of a user of a service in an IMS network is provided, the system comprising:
a first server having means for acquiring service traffic information of said user for said at least one service from the IMS network and for sending the service traffic information to a managing node;
a managing node having means for receiving said service traffic information, checking if said service traffic information of the user meets a set of criteria predefined in the managing node and to, if the service traffic information of the user does not meet the set of criteria, sending a request from the managing node to a configuration server for deleting the data of said user from a Home subscriber server, HSS;
a detecting node having means for monitoring messages between the HSS and a CSCF, call session control function server and when the CSCF receives a request for a communication between a first user and a second user and the detecting node detects an error message from the HSS to the CSCF telling that the data of the second user is not included in the HSS, sending a message to the CSCF indicating that said communication request should be directed to the first server;
a configuration server having means to receive a request from the managing node for deleting the data of said user from the HSS and means for deleting the data of said user from the HSS.

Finally, a computer program comprising computer program code means adapted to perform the above-described method is presented.

In particular, the invention may be found in a method for managing user provisioning of at least one service in a IMS network characterized by comprising the steps of: a) receiving service traffic information of the user for the at least one service from the IMS network at a managing node; b) checking in the managing node if said service traffic information of the user meets a set of predefined criteria in the managing node; c) if the service traffic information of the user does not meet the set of criteria, said user is marked as non-active for the at least one service by the managing node and it sends an indication to a configuration server, indicating that said user has been marked as non-active for the at least one service; and d) after receiving said indication the configuration server, sending a message to a Home subscriber server, HSS, telling the HSS to delete the data of said user, said message including a user identification of said user The method may further comprise: e) acquiring the service traffic information of the user at a first server and sending the service traffic information to the managing node; and f) deleting the data of said user at the HSS.

In a second aspect, the method comprises: g) a detecting node monitoring the messages between the HSS and a call session control function, CSCF, server; h) when the CSCF server receives a request for a communication between a first user and a second user, if the detecting node detects an error message from the HSS to the CSCF server, telling that the data of the second user is not included in the HSS, the detecting node sends a message to the CSCF server indicating that said communication request should be directed to the first server and the CSCF server forwards said communication request to the first server; i) the first server receiving the communication request directed by the detecting node and notifying to the managing node; j) sending a message to the HSS including information to register said second users data in the HSS; k) after receiving said message, the HSS registering said second users data. This second aspect may be combined with the first aspect above.

The method may further comprise after step h), a step where the first server indicates to the first user, to try again the request for communication with the second user after a certain period of time. Optionally, said indication by the first server to the first user is a response to a SIP INVITE message sent by the CSCF server to the first server, said response being a 503 Retry After. Optionally, the message in step j) is sent from the managing node to the HSS. Optionally, the message in step j) is first sent from the managing node to a Network Abstraction Layer and from the Network Abstraction Layer to the HSS. Optionally, the message in step j) is first sent from the managing node to the configuration server and from the configuration server to the HSS.

Optionally, the at least one service is an RCS, Rich Communication Suite, service and where the configuration server is an RCS auto configuration server and the user is an RCS user. Optionally, the managing node is part of the configuration server. Optionally, the message from the HSS to the CSCF server, telling that the data of the second user is not included in the HSS is a Diameter Error User Unknown Message.

In another aspect, there is provided a network node, comprising: an input for receiving service traffic information of a user for at least one service in a IMS network, the service traffic information being indicative of user activity; checking logic, configured to check if said service traffic information of the user meets a set of predefined criteria; and a request output configured to send a request to a Home subscriber server, HSS, for deleting the data of said user, if the service traffic information of the user does not meet the set of predefined criteria.

In another aspect, there is provided a network node, comprising: an input for acquiring service traffic information of a user for at least one service in a IMS network, the service traffic information being indicative of user activity; and a node output, configured to send said service traffic information to another network node, and to notify the another network node when a communication request is received from a Call Session Control Function, CSCF, server.

In another aspect, there is provided a network node, comprising: monitoring logic, configured to monitor messages between a Home Subscriber Server, HSS and a call session control function, CSCF, server; a direction output, configured when the CSCF server receives a request for a communication between a first user and a second user and the detecting node detects an error message from the HSS to the CSCF server telling that the data of the second user is not included in the HSS, to send a message to the CSCF server indicating that said communication request should be directed to a first server.

In another aspect, there is provided a system for managing provisioning of a user of a service in a IMS network, the system comprising: a first server, configured to acquire service traffic information of said user for said at least one service from the IMS network and to send the service traffic information to a managing node; and a managing node, configured to receive said service traffic information, to check if said service traffic information of the user meets a set of predefined criteria in the managing node and to, if the service traffic information of the user does not meet the set of predefined criteria, send a request from the managing node to a configuration server for deleting the data of said user from a Home subscriber server, HSS. Optionally, the system may further comprise a detecting node, configured to monitor messages between the HSS and a call session control function, CSCF, server and when the CSCF server receives a request for a communication between a first user and a second user and the detecting node detects an error message from the HSS to the CSCF server telling that the data of the second user is not included in the HSS, to send a message to the CSCF server indicating that said communication request should be directed to the first server; and a configuration server, configured to receive a request from the managing node for deleting the data of said user from the HSS and to for delete the data of said user from the HSS.

In another aspect, there is provided a computer program product comprising computer program code adapted to perform the method described herein when said program code is executed on a computer, a digital signal processor, a field-programmable gate array, an application-specific integrated circuit, a micro-processor, a micro-controller, or any other form of programmable hardware.

The above features and advantages do not limit the present invention, and those skilled in the art will recognize additional features and advantages upon reading the following detailed description and upon viewing the accompanying drawings.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented:

FIG. 1 shows a block diagram of a registration management system according to one embodiment of the present invention.

DETAILED DESCRIPTION OF THE INVENTION

This invention describes a process for managing the provisioning and deprovisioning (although this may initially involve registering and deregistering) of users of a service in an HSS. Monitoring the traffic of each user determines, according to a certain criteria, if the user is active or non-active. Non-active users are deprovisioned from the HSS solving the oversizing problem.

This smart capacity management may achieve two goals: reducing the number of registered users and/or the number of provisioned users; and to provide a transparent situation for the user who is not registered and/or provisioned, to provide service continuity for all users. The network usage may be dynamically adjusted based on the real usage, thus creating a more efficient network.

Provisioning a user in the HSS implies preparing the HSS to allow it to provide a service for said user. Preparing the HSS is done by sending subscription-related information to the HSS and generally speaking, by sending to the HSS any data necessary to provide services for said user (such as the identity, services which the user is registered, locations . . . ).

A provisioned user, therefore, will be a user who is provisioned in the HSS, that is, whose data necessary to provide services for said user is in the HSS.

Deprovisioned users are a problem when another provisioned user tries to reach them, but proposed invention solves said problem by detecting the communications directed to deprovisioned users between the CSCF and the HSS and telling the HSS to include them again.

The management of the provisioning and deprovisioning of the users is illustrated by FIG. 1, where can be seen a particular embodiment of the invention.

Deprovisioning

A user 1 of a rich communicating service (RCS) is provisioned in a HSS 2 of an IMS network 3 to enable peer-to-peer communication with other clients of RCS.

An application server connected to the IMS network, in this embodiment of the invention a RCS-application server 4, is in charge of collecting information about every RCS event. The events collected contain information such as origin, destination(s), time, day, duration, response code, etc. All the events are recorded generating traffic information of each user of RCS in the network, being this traffic information originated for example by 1 on 1 chat, 1 to many chat, file transfer, video-share, image-share, VoIP . . . .

Optionally, an Originating Policy Control Application Server (O-PCAS) (not shown) may be responsible for creating the originating activity records for every RCS-e transaction excluding group-chat. To avoid network complexity, this functionality may be triggered with the same headers as Application Interface Charging Server (AICS) and Videoshare CDRs, with the same network trigger. O-PCAS may also dynamically detect the activity aimed towards a de-provisioned user.

Also an optional Terminating Policy Control Application Server (T-PCAS) (not shown) may be responsible for creating activity records for RCS-e actions originating in interconnected networks. To avoid network complexity, this functionality shall be triggered with the same headers as Videoshare CDRs, with the same network trigger. T-PCAS may also dynamically detect the activity aimed towards a de-provisioned user.

Once the traffic information has been collected in the application server, it is sent 5 to a managing node 6, included in this embodiment of the invention as "RCS Activity Manager" or "RAM". This node is responsible for maintaining an individualized record of activity for every RCS user. It is defined a certain criteria (for example, establishing a threshold) for the data collected. This process can include: the last day of activity, the total amount of events for a certain period of time (day/week/month . . . ), a statistical model for the past usage, etc. Based on these records, and according to the criteria set, the node marks as active/non-active the users based on the criteria match, (in other words, if the traffic information collected for a user meet the criteria set, the RAM marks the user as active, i.e it assigns an "active" state to the user, and if the traffic information collected for an user do not meet the criteria set, the RAM marks the user as non-active (i.e it assigns a "non-active" state to the user). For example, setting a threshold=7 for a number of days without activity means that a user without any activity in the last 7 days will be considered as a "non-active" user. Another example is setting a criterion for the number of events per month, and consider as "non-active" to a user who does not make at least 5 events per month. Any combination of these criteria may be used in a statistical process to set a more complete threshold finely tuned according to the whole traffic information.

The RAM node communicates with the AutoConfiguration Server 7 (ACS), responsible for the client provisioning and deprovisioning as discussed previously, and when the ACS receives a user marked as "non-active" triggers deprovisioning said user at the HSS deleting them from the database or making any action which liberate the space occupied in the HSS.

In an embodiment, the communication between the RAM and the ACS is dynamic and asynchronous. It can be made using any known protocol, for example an API REST or an API SOAP. In an embodiment, when there is a change of state for a user, the RAM communicates said change of state to the ACS, including the user identification.

The RAM 6 may therefore maintain the activity records for every enabled user. This activity may be used to decide whether a user should be marked as active or de-provisioned. One of the key factors to decide this activity field may be the RCSe client version and vendor, and its compatibility with the proposed functionality. Typically, only Registered Users Smart Capacity Management (RUSCM) compatible clients will be designated as de-provisioned. The RAM module 6 may receive information from O-PCAS and T-PCAS and information of group chat from the IM may be additionally provided. The RAM 6 may further detect the activity aimed towards a de-provisioned user. In this case, the RAM 6 or ACS 7 may be responsible for sending an autoconfiguration SMS to the user to retrieve a new status and xml for the server.

Provisioning

When a provisioned user 1 tries to reach a deprovisioned user, the communication is directed to a Session Border Controller 8 (SBC) as a common procedure into the signaling and media paths between users in an IMS communication and functioning as a gateway for the IMS network. Then the node CSCF 9 (which may be provided as a Virtual CSCF Application Server, VCAS), using Diameter interfaces ask to the HSS for information on the location of the destination user in order to establish a communication. In this embodiment, a Location Information Request (LIR) message is sent to the HSS and the HSS answer reflects that the user is not provisioned in the HSS.

This particular embodiment of the invention comprises a node 10 called IDR (Intelligent Diameter Router) which detects the RCS communications directed to users that are not provisioned in the HSS. When the CSCF send the Location Information Request (code 302 in Diameter protocol) to the HSS and the user is not provisioned, the response of the HSS is a "DIAMETER_ERROR_USER_UNKNOWN". This response is monitored by the IDR and directs the SIP signaling to a virtual RCS endpoint implemented at the RCS-application server 4. This may be done, for example, by the IDR manipulating the headers of the communication when a "DIAMETER_ERROR_USER_UNKNOWN" is detected, for example by manipulating the ServerName with RCS-AS IP. Once the IDR have manipulated the headers to direct the communication to the RCS-AS, and relayed the Diameter response back to the CSCF, the SIP communication is sent through the CSCF, which sends the SIP request to the RCS-AS, according to the new headers.

In a particular embodiment, these steps will be performed:

The CSCF sends a DIAMETER LIR message to the HSS through the IDR.

The HSS replies with a DIAMETER LIA including an error message because a user is not found in the HSS.

The IDR manipulates said DIAMETER LIA message, so the DIAMETER LIA is sent to the CSCF without error and including a Server name (that will correspond to the RCS-AS identity).

The CSCF reads the Server Name (RCS AS identity) included in the DIAMETER LIA and sends a SIP message to the RCS-AS.

The IDR module may therefore detect 404 responses in the Diameter queries to the HSS, and change the routing configuration towards the VCAS.

The RCS-application server, when it receives the SIP signaling from the CSCF, generates an activity report to the RAM 6. This activity report contains relevant information for the SIP transaction redirected to RCS-AS (such as identity, SIP transaction, time, etc). The activity report is notified to the RAM, which is responsible for maintaining an individualized record of activity for every RCS user as previously discussed, and since the activity corresponds to a user marked as a "non-active" user, the RAM changes his state to "active" and the RAM performs the provisioning of the user in the HSS sending the updated parameters.

In one alternative embodiment of the invention, the RAM communicates with the ACS 7 to notify him that a user has changed his state from "non-active" to "active". Then the ACS sends the updated parameters to the HSS provisioning the previously deprovisioned user. Thus, the provisioning of the user can be made by RAM or ACS, directly to the HSS or using, in another embodiment of the invention a Network Abstraction Layer (NAL) 12 depending on the policies adopted by the service provider (in many cases the HSS are not allowed to be reached directly by the ACS or any other node)

Generally speaking when a user changes his state from "non-active" to "active, the ACS (or the RAM) sends the updated parameters to the HSS provisioning the previously deprovisioned user.

Additionally, the RCS-AS sends an appropriate response for the SIP request sent from the CSCF. In the case of a first user trying to communicate with a second user, the HSS will report an error because the second user cannot be located in the HSS. In this case the error message will be intercepted by the IDR and, as explained before, it will change the headers of the message so the CSCF sends a SIP INVITE message to the RSC-AS, the SIP request message sent by CSCF to the RCS-AS is answered by the RCS-AS with a 503 Retry-After message which will be sent to the first user to make another trial. In the second or successive trials the communication is established because, according to the method of the invention, the non-provisioned user is already provisioned.

Thus the VCAS server may receive all the SIP requests directed towards an identity who is not provisioned in the HSS. In order to answer correctly to the SIP requests, the VCAS may contain information about the provisioned users from the ACS. Depending on the request issued, the server may implement several actions. A first is an RCSe Options request, by looking at the contact or accept-contact information (possibly including one or more RCSe specific option tags). This request may be answered with a 200 OK with default capabilities when the Request uri is an enabled user. The default capabilities may be configurable and may be one or more of the following: 1 to 1 chat, 1 to many chat, file transfer (with or without store and forward), videoshare and image share. If the request uri is not Joyn enabled, the answer shall consist of a SIP 404 response. A second is an RCSe INVITES: detecting Invites request may be achieved by looking at the contact or accept-contact information (possibly including one or more RCSe specific option tags). In all of these cases, these may comprise a 503 Retry After response. The timer for the Retry After may be determined in preproduction tests, based on the average time to reprovision and activate an user. A third option is another SIP request: to avoid interfering with other services, VCAS may return, not modify the information and send it back to the CSCF.

Another case is the error produced when a first user is trying to determine the reachability of a second user and said second user has been deprovisioned (and consequently, it cannot be found in the HSS). In this case, the RCS-AS sends a confirmation message to the CSCF (which will be sent to the first user), indicating that the second user is reachable. And said second user will be provisioned in the HSS as explained before. This can be done by the RCS-AS answering to a SIP OPTIONS message is with a SIP 200 OK with capabilities, which indicates that the user was in the HSS but have been deprovisioned.

The transition from active to deprovisioned status will now be discussed on a practical level. The transition from active to de-provisioned may be marked by the Autoconfiguration server. When an autoconfiguration request is made, the ACS may check in RAM if the de-provisioned condition is to be applied in this case. For this to happen, the RAM may implement a time-based decision, and the following conditions may be met: the user has been provisioned for more than X days, with X a configurable value; the user does not have any activity record in this X days, including both originating and terminating (the services monitored may be: 1 to 1 chat, file transfer, image-share and video-share. In a phase 1.2, CDRs from the IM-AS concerning Group-chat could be added in the RAM database); the user is requesting the autoconguration with a (Registered-Provisioned) Users Smart Capacity Management ((R-P)USCM) enabled client; the client has been in inactive status (xml version=−2) for Y days, with Y a configurable value (this means that the user, despite not being registered, did not receive any terminating activity in that time).

Unlike the RUSCM, which may require no further action from ACS, in this case, it may be mandatory to deprovision the user. In case of deprovision, the affected systems may be: IM-AS, HSS and ENUM. No systems integration or conciliation may be required in this phase. For this purpose, Provisioning Interface (PINT) may be used.

The transition from deprovisioned to active status will now be discussed on a practical level. The transition from de-provisioned to active may be determined either by the auto-configuration server or the client itself, being almost the same than the case of RUSCM transition from inactive to active. At the client, it may be able to detect when a request is made by direct interaction of the user or a periodic or automatic request may be used. When the client detects a user interaction (the user manually opens the client, for instance), it may request a new autoconfiguration xml with a version=−3. This way, the ACS may detect that the client is willing to register in order to start an interaction with another RCSe user. In this case, the ACS may follow the normal autoconfiguration process, including the provision through PINT in HSS and ENUM (the provision in IM-AS will happen automatically when the user registers) and answering with an xml with version !=−2. At the ACS, RAM and PCAS, in case the ongoing activity involves a non-registered user (a user with version=−2), the process may be different. Firstly, both O-PCAS and T-PCAS may detect that an INVITE aimed to a de-provisioned client has been sent. This information about the B party may be sent to the ACS, who may provision the user in the same terms than before and may issue a binary SMS to make the client request a new version of the xml. The field version of the newly issued xml may be "version" !=−2. This activity may also be incorporated to the RAM database. When the client receives an xml with version !=−2, the client may register again. However, if this does not happen, the client can make the periodic xml request. In order to make the client receive the pending messages or file transfers, the xml version issued may be "version" !=−2.

Although the present invention has been described with reference to specific embodiments, it should be understood by those skilled in the art that the foregoing and various other changes, omissions and additions in the form and detail thereof may be made therein without departing from the scope of the invention as defined by the following claims.

The invention claimed is:
1. A method for managing user provisioning of at least one service in an IP Multimedia Subsystem (IMS) network, the method comprising:
 a) acquiring service traffic information of a user for the at least one service from the IMS network at a first server and the first server sending the service traffic information to a managing node;
- b) receiving the service traffic information of the user at the managing node;
- c) checking in the managing node if said service traffic information of the user meets a set of predefined criteria in the managing node;
- d) if the service traffic information of the user does not meet the set of criteria, marking said user as non-active for the at least one service by the managing node and the managing node sending an indication to a configuration server, indicating that said user has been marked as non-active for the at least one service; and
- e) after receiving said indication, the configuration server sending a message to a Home subscriber server (HSS) telling the HSS to delete the data of said user, said message including a user identification of said user;
- f) deleting the data of said user at the HSS;
- g) monitoring, by a detecting node, messages between the HSS and a call session control function (CSCF) server;
- h) when the CSCF server receives a request for a communication between a first user and a second user, if the detecting node detects an error message from the HSS to the CSCF server indicating that the data of the second user is not included in the HSS, the detecting node sending a message to the CSCF server indicating that said communication request should be directed to the first server, and the CSCF server forwarding said communication request to the first server;
- i) the first server receiving the communication request directed by the detecting node and notifying the managing node,
- j) the configuration server sending a message to the HSS including information to register said second user's data in the HSS, and
- k) after receiving the message from the configuration server, the HSS registering said second user's data.

2. The method according to claim 1, further comprising after step h), a step where the first server indicates to the first user, to try again the request for communication with the second user after a certain period of time.

3. The method according to claim 2 wherein said indication by the first server to the first user is a response to a SIP INVITE message sent by the CSCF server to the first server, said response being a 503 Retry After.

4. The method according to claim 1, wherein the message in step j) is sent from the managing node to the HSS.

5. The method according to claim 1, wherein the message in step j) is first sent from the managing node to a Network Abstraction Layer and from the Network Abstraction Layer to the HSS.

6. The method according to claim 1, wherein the message in step j) is first sent from the managing node to the configuration server and from the configuration server to the HSS.

7. The method according to claim 1, wherein the at least one service is a Rich Communication Suite (RCS) service and the configuration server is an RCS auto configuration server and the user is an RCS user.

8. The method according to claim 1, wherein the managing node is part of the configuration server.

9. The method according to claim 1, wherein the message from the HSS to the CSCF server, indicating that the data of the second user is not included in the HSS, is a Diameter Error User Unknown Message.

10. A hardware apparatus comprising a network node configured to monitor messages between a Home Subscriber Server (HSS) and a call session control function (CSCF), server, the network node being configured such that when the CSCF server receives a request for a communication between a first user and a second user and the network node detects an error message from the HSS to the CSCF server indicating that the data of the second user is not included in the HSS, the network node sends a message to the CSCF server indicating that said communication request should be directed to a first server.

11. A system for managing provisioning of users of services in an IP Multimedia Subsystem (IMS) network, the system comprising:
- a hardware apparatus comprising a first server configured to acquire service traffic information of a first user for at least one service from the IMS network and to send the service traffic information to a managing node;
- a managing node, configured to receive said service traffic information from the first server and to check if said service traffic information meets a set of predefined criteria in the managing node and to, if the service traffic information does not meet the set of predefined criteria, send a request to a configuration server for deleting the data of said first user from a Home subscriber server (HSS);
- a configuration server, configured to receive the request from the managing node for deleting the data of said first user from the HSS and to send a message to the HSS to delete the data of said first user from the HSS; and
- a detecting node, configured to monitor messages between the HSS and a call session control function (CSCF) server, the detecting node being configured such that when the CSCF server receives a request for a communication between a second user and the first user and the detecting node detects an error message from the HSS to the CSCF server indicating that the data of the first user is not included in the HSS, the detecting node sends a message to the CSCF server indicating that said communication request should be directed to the first server.

* * * * *